United States Patent Office 2,963,379
Patented Dec. 6, 1960

2,963,379

HARD WAXES AND PROCESS FOR THEIR MANUFACTURE

Josef Kaüpp, Guido von Rosenberg, and Heinrich Träger, all of Gersthofen, near Augsburg, Germany, assignors to Farbwerke Hoechst Aktiengesellschaft vormals Meister Lucius & Bruning, Frankfurt am Main, Germany, a corporation of Germany No Drawing. Filed Jan. 31, 1958, Ser. No. 712,301

Claims priority, application Germany Feb. 7, 1957

9 Claims. (Cl. 106—268)

The present invention relates to novel hard waxes yielding films with high gloss and a process for their manufacture.

It is known to esterify montanic acids with polyhydric alcohols and to obtain products which are superior to the montanic acids used as starting material in regard to their oil-binding properties.

It is also known to convert the free acid groups of products, obtained by partial esterification of montanic acids with polyhydric alcohols, largely into salts by reacting them with substances forming wax soaps and thus to obtain waxes which are distinguished by very good oil-binding properties and yield pastes leaving behind a brilliant wax film.

Now, we have found that very valuable ester waxes producing an excellent high gloss can be obtained when reacting aliphatic acids having more than 18 carbon atoms, preferably the acids contained in montan wax having been bleached by oxidation, with aromatic dimethylol compounds alone or mixtures thereof with aromatic monomethylol compounds and/or polymethylol compounds and/or aliphatic glycols. When using these aromatic dimethylol compounds, which are easily obtained by saponification of the dichlorodimethyl compounds available in a simple manner by the chloromethylation of aromatic nuclei, the surface gloss and hardness of the waxes is substantially increased. These effects cannot be attained when using purely aliphatic diols as alcohol components. The waxes obtained from dimethylol compounds and the aforementioned acids have a light yellow to brown color and are very hard and have, even when not yet having partly been transformed into salts—such as calcium salts—as high a gloss as carnauba wax and can be utilized for the production of floor waxes and leather polish. They can, however, also be used as additives to other waxes, especially refined products of montan wax, considerably increasing the hardness and gloss of these products. These waxes may, however, also be produced in a single operation by reacting, for example, montanic acids or behenic acid or the like with a mixture of the aromatic dimethylol compounds and aliphatic glycols thus obtaining products having a certain content of aromatic dimethylol compounds. In this case, however, the composition of the wax is, of course, different from that when preparing pure mixtures; the latter case, however, not being of importance for the application on an industrial scale.

Instead of the pure dimethylol compounds there may also be used commercial mixtures still containing monomethylol and/or polymethylol compounds. The dimethylol compounds are suitably employed in an amount of at least 10 mol percent of the alcohol mixture, preferably in an amount of 20-60 mol percent. In special cases there may also be used smaller amounts than 10 mol percent and larger amounts than 60 mol percent.

The mol proportion of the reactants used may vary within wide limits without essentially impairing the above-described properties. For example, 1.5 to 0.7 equivalents of the dimethylols and/or mixtures thereof with monomethylols and/or polymethylols may be caused to act upon 1 equivalent of the wax acids employed. When there is a surplus of hydroxyl or acid functions, the products obtained may be still further modified. For example, the fatty or wax acids which may still be contained in the reaction product can be converted into salts by treating them with alkali metal or alkaline earth metal oxides or -hydroxides, such as sodium-, potassium-, lithium-, calcium-, strontium- or barium hydroxide, or other alkaline reacting substances or mixtures of such substances. In special cases, the properties of the waxes obtained according to the process of the invention may be improved by adding calcium soaps, on the one hand, and additionally aluminum- and/or zinc- and/or magnesium soaps, on the other hand, for example of the stearates or montanates, or by the action of soap-forming compounds of these metals taking place successively. The portion of the metal component contained in these products should suitably range from 0.3 to 4%, calculated upon the wax, and the ratio of weight between calcium and the total amount of aluminum, zinc and magnesium should be between 1:5 and 5:1. Another possibility of modifying the products consists in converting the unreacted hydroxyl groups with di-isocyanates, such as hexamethylene di-isocyanate, cyclohexylene di-isocyanate, toluylene di-isocyanate, 4,4'-dicyclohexylmethane di-isocyanate, 4,4'-diphenylmethane-di-isocyanate, or like products.

The wax acids obtained in the course of the chromic acid oxidation of montan wax may advantageously be used as fatty acids or wax acids. However, there may also be employed as acid component fatty acids and wax acids and/or mixtures thereof either in the natural state or prepared synthetically, inasmuch as they have a chain length of more than $C_{18}$, such as behenic acid, cerotinic acid, carnauba wax acids or paraffin oxidation acids.

There are mentioned as examples of suitable methylol compounds ortho-, meta-, or para-dimethylols of benzene, toluene, xylene, ethyl benzene, cumene, cymene, naphthalene, α-naphthyl-methyl-ether, nerolin, methyl naphthalene, diphenyl, anthracene, fluorene, acenaphthene, phenanthrene, anisol, phenetole, diphenyl ether, ditolyl ether, chlorobenzene, chlorotoluene, bromotoluene, nitrobenzene, nitrotoluene, nitronaphthalene, or mixtures of these dimethylol compounds or mixtures with the corresponding methylol compounds of the substances mentioned with compounds containing one, or three, or more methylol groups. The para-dimethylol compounds are especially suitable therefor.

As glycols there may be used with advantage the compounds known for the preparation of waxes, for example ethylene glycol, propylene glycol, propane-diol-1,2, the butanediols such as butylene glycol, pentane-diol, hexane-diol, decane-diol, or mixtures of these compounds with tri- or tetrahydric alcohols, such as glycerol, trimethylol propane, trimethylol ethane, hexanetriol, pentaerythritol. The portion of diols should advantageously amount to at least 50% by weight of the alcohol mixture.

The esterification may be effected in known manner, for example at temperatures ranging from 105 to 200° C., if necessary with the application of pressure, in the melt, or may in general be carried out more advantageously in known solvents, such as benzene, toluene, xylene, while the solvent may simultaneously be used as entrainer for the reaction water forming. In order to accelerate the reaction, the usual esterification catalysts such as, for example, sulfuric acid, phosphoric acid, paratoluene sulfonic acid, etc. may be added. It may also be of advantage to employ protective gases preventing oxidation ($N_2$, $CO_2$).

The following examples serve to illustrate the invention, but they are not intended to limit it thereto, the parts being by weight:

Example 1

412.0 parts of a montan wax acid (acid number 136) obtained by chromic acid bleaching are heated in an agitator-vessel at 150–170° C., while passing over nitrogen, with 130.0 parts of dimethylol xylene (of about 96% strength) while adding 0.4 part of sulfuric acid of 20% strength until the acid number has receded to 17–18.

A light-colored, very hard wax is obtained of a flowing/dropping point (according to Ubbelohde) of 75/76° C. The wax can be well emulsified both with ionic and non-ionic emulsifiers producing a good gloss in the wax pastes prepared therewith.

Example 2

In an apparatus provided with a reflux condenser, a water separator and an agitator, there are heated to vigorous boiling while passing through a current of nitrogen, 450.0 parts of bleached montan wax acid, 102.0 parts of dimethylol xylene (of about 90% strength) and 400.0 parts of xylene while adding 0.8 part of $H_2SO_4$ of 20% strength until the amount of reaction water to be expected has almost separated. After complete distillation of the xylene, a light-colored, very hard wax is obtained having an acid number of 16–18 and a flowing/dropping point of 76/77° C. The wax pastes prepared therewith produce an excellent gloss.

Example 3

By esterification of 412.0 parts of montanic acid with 60.5 parts of dimethylol xylene of 96% strength and by adding 0.4 part of $H_2SO_4$ of 20% strength in a manner analogous to Example 1, there is obtained a light-colored wax having an acid number of 54–56 and a flowing/dropping point of 76/80° C. When converting this wax with 3.7% of calcium hydroxide at 130–140° C., a hard wax is obtained of an acid number of 10 and a flowing/dropping point of 92/102° C. Both the esterification product as such and the esterification product having partially or completely been converted into calcium salt have good paste-forming and gloss-producing properties.

Example 4

When applying the process described in Example 2 to 600.0 parts of montanic acid, 166.0 parts of dimethylol naphthalene (of 70% strength), 600 parts of xylene and 0.6 part of $H_2SO_4$ of 20% strength, a light-colored, very hard wax is obtained of an acid number of 33 and a flowing/dropping point of 77/78° C. Pastes prepared with this wax likewise produce brilliant wax films.

Example 5

When using, in a manner analogous to Example 3, 412.0 parts of montanic acid and 80.0 parts of dimethylol naphthalene of 70% strength, there is obtained a hard wax of an acid number of 56 and a flowing/dropping point of 77/79° C. which, by saponification with 3.75% of $Ca(OH)_2$ at 130–140° C., yields a product of an acid number of 11 and a flowing/dropping point of 100/106° C. Both the esterification product as such and the esterification product having partially or completely been converted into calcium salt can be worked up into pastes producing a very good to excellent gloss.

Example 6

When esterifying, under the conditions as described in Example 2, 472.0 parts of a commercial behenic acid with 144.0 parts of an alcohol mixture consisting to about 30% of monomethylol xylene and about 70% of dimethylol xylene, a light-brown, hard wax of an acid number of 22–25 is obtained having a flowing/dropping point of 54/55° C. which, especially as regards the gloss of the pastes prepared therewith, is substantially superior to comparable products which can be obtained by esterification of behenic acid with, for example, ethylene glycol.

Example 7

A mixture of 315.0 parts of a commercial behenic acid and 114.0 parts of dimethylol naphthalene of 70% strength is heated at 150–170° C. in the presence of 0.4 part of sulfuric acid of 20% strength in an agitator vessel, while passing over nitrogen, until the acid number has receded to 25–30.

A light-brown, hard wax is obtained of a flowing/dropping point of 54.5/55.5° C.

Example 8

610.0 parts of bleached montan wax acid are heated at 115–120° C. in an agitator vessel with 28.5 parts of ethylene glycol while adding 0.6 part of sulfuric acid of 20% strength and passing over nitrogen until the acid number of the mixture has receded to 90–95. Then the temperature of the reaction mixture is increased to 150–170° C. After 116.0 parts of finely pulverized dimethylol xylene (of about 96% strength) have been admixed, the mixture is further esterified until an acid number of 15–20 has been obtained. The light-colored, very hard wax thus obtained has a flowing/dropping point of 77/78° C. The wax pastes prepared therewith are distinguished by a very good gloss.

We claim:

1. Hard waxes yielding films with high gloss comprising esterification products of montan wax acids with a product selected from the group consisting of (A) aromatic dimethylol compounds in which all hydroxyl groups are bound to aliphatic carbon atoms, (B) mixtures of said aromatic dimethylol compounds with aromatic methylol compounds other than dimethylol compounds, (C) mixtures of product A with dihydric to tetrahydric aliphatic alcohols, and (D) mixtures of product B with dihydric to tetrahydric aliphatic alcohols at least 50 percent by weight of the aliphatic alcohols consisting of dihydric aliphatic alcohols and at least 10 mol percent of the alcoholic component of the waxes consisting of the dimethylol compound.

2. Hard waxes yielding films with high gloss comprising an esterification product of an aliphatic carboxylic acid containing more than 18 carbon atoms with a product selected from the group consisting of (A) aromatic dimethylol compounds in which all hydroxyl groups are bound to aliphatic carbon atoms, (B) mixtures of said aromatic dimethylol compounds with aromatic methylol compounds other than dimethylol compounds, (C) mixtures of product A with dihydric to tetrahydric aliphatic alcohols, and (D) mixtures of product B with dihydric to tetrahydric aliphatic alcohols at least 50 percent by weight of the aliphatic alcohols consisting of dihydric aliphatic alcohols in which waxes at least 10 mol percent of the alcoholic component consist of the dimethylol component and in which non-esterified carboxylic groups are converted into a salt of a metal of main groups 1 to 2 of the periodic table.

3. Hard waxes yielding films with high gloss comprising an esterification product of an aliphatic carboxylic acid containing more than 18 carbon atoms with a product selected from the group consisting of (A) aromatic dimethylol compounds, in which all hydroxyl groups are bound to aliphatic carbon atoms, (B) mixtures of said aromatic dimethylol compound with aromatic methylol compounds other than dimethylol compounds, (C) mixtures of product A with dihydric to tetrahydric aliphatic alcohols, and (D) mixtures of product B with dihydric to tetrahydric aliphatic alcohols at least 50 percent by weight of the aliphatic alcohols consisting of dihydric aliphatic alcohols, in which waxes at least 10 mol percent of the alcoholic component consist of the dimethylol compound.

4. Hard waxes yielding films with high gloss comprising an esterification product of an aliphatic carboxylic acid containing more than 18 carbon atoms with a product selected from the group consisting of (A) aromatic dimethylol compounds in which all hydroxyl groups are bound to aliphatic carbon atoms, (B) mixtures of said aromatic dimethylol compounds with aromatic methylol compounds other than dimethylol compounds, (C) mixtures of product A with dihydric to tetrahydric aliphatic alcohols, and (D) mixtures of product B with dihydric to tetrahydric aliphatic alcohols at least 50 percent by weight of the aliphatic alcohols consisting of dihydric alcohols, in which waxes 20 to 60 mol percent of the alcoholic component consist of said dimethylol compound.

5. Hard waxes yielding films with high gloss comprising an esterification product of an aliphatic carboxylic acid containing more than 18 carbon atoms with a product selected from the group consisting of (A) aromatic dimethylol compounds in which all hydroxyl groups are bound to aliphatic carbon atoms, (B) mixtures of said aromatic dimethylol compounds with aromatic methylol compounds other than dimethylol compounds, (C) mixtures of product A with dihydric to tetrahydric aliphatic alcohols, and (D) mixtures of product B with dihydric to tetrahydric aliphatic alcohols at least 50 percent by weight of the aliphatic alcohols consisting of dihydric aliphatic alcohols, in which waxes at least 10 mol percent of the alcoholic component consist of the dimethylol component and in which waxes unchanged carboxylic groups are in part converted to calcium salts and in part converted into salts of a metal selected from the group consisting of aluminum salts, zinc salts, magnesium salts, and mixtures thereof.

6. Hard waxes yielding films with high gloss comprising an esterification product of an aliphatic carboxylic acid containing more than 18 carbon atoms with a product selected from the group consisting of (A) aromatic dimethylol compounds in which all hydroxyl groups are bound to aliphatic carbon atoms, (B) mixtures of said aromatic dimethylol compounds with aromatic methylol compounds other than dimethylol compounds, (C) mixtures of product A with dihydric to tetrahydric aliphatic alcohols, and (D) mixtures of product B with dihydric to tetrahydric aliphatic alcohols at least 50 percent by weight of the aliphatic alcohols consisting of dihydric aliphatic alcohols, in which waxes at least 10 mol percent of the alcoholic component consist of the dimethylol component and in which waxes unchanged carboxylic groups are in part converted to calcium salts and in part converted into salts of a metal selected from the group consisting of aluminum salts, zinc salts, magnesium salts, and mixtures thereof, the total metal content being in the range from 0.3 to 4 percent calculated upon the wax, and the ratio between calcium and said other metal being in the range from 1:5 to 5:1.

7. A process for the manufacture of hard waxes which comprises reacting carboxylic acid containing more than 18 carbon atoms with a product selected from the group consisting of (A) aromatic dimethylol compounds in which all hydroxyl groups are bound to aliphatic carbon atoms, (B) mixtures of said aromatic dimethylol compounds with aromatic methylol compounds other than dimethylol compounds, (C) mixtures of product A with dihydric to tetrahydric aliphatic alcohols, and (D) mixtures of product B with dihydric to tetrahydric aliphatic alcohols at least 50 percent by weight of the aliphatic alcohols consisting of dihydric aliphatic alcohols.

8. Wax compositions containing as an essential ingredient esterification products of an aliphatic carboxylic acid containing more than 18 carbon atoms with a product selected from the group consisting of (A) aromatic dimethylol compounds in which all hydroxyl groups are bound to aliphatic carbon atoms, (B) mixtures of said aromatic dimethylol compounds with aromatic methylol compounds other than dimethylol compounds, (C) mixtures of product A with dihydric to tetrahydric aliphatic alcohols, and (D) mixtures of product B with dihydric to tetrahydric aliphatic alcohols at least 50 percent by weight of the aliphatic alcohols consisting of dihydric aliphatic alcohols.

9. Hard waxes yielding films with high gloss comprising an esterification product of an aliphatic carboxylic acid containing more than 18 carbon atoms with a product selected from the group consisting of (A) aromatic dimethylol compounds in which all hydroxyl groups are bound to aliphatic carbon atoms, (B) mixtures of said aromatic dimethylol compounds with aromatic methylol compounds other than dimethylol compounds, (C) mixtures of product A with dihydric to tetrahydric aliphatic alcohols, and (D) mixtures of product B with dihydric to tetrahydric aliphatic alcohols at least 50 percent by weight of the aliphatic alcohols consisting of dihydric aliphatic alcohols, in which waxes at least 10 mol percent of the alcoholic component consist of the dimethylol component and in which waxes the alcoholic component and the carboxylic acid being contained in said waxes in an amount of 0.7 to 1.5 equivalents of hydroxy groups for each equivalent of the carboxylic acid.

References Cited in the file of this patent

UNITED STATES PATENTS

| | | |
|---|---|---|
| 2,265,141 | Bruson | Dec. 9, 1941 |
| 2,835,635 | Mayhew et al. | May 20, 1958 |